April 7, 1970   J. E. DITTY   3,504,901
SHOCK ABSORBER
Original Filed July 5, 1966

INVENTOR.
JAMES E. DITTY
BY
J.B. Holden
ATTORNEY 3,504,901
SHOCK ABSORBER
James E. Ditty, North Canton, Ohio, assignor to The Goodyear Tire & Rubber Company, Akron, Ohio, a corporation of Ohio
Continuation of application Ser. No. 562,681, July 5, 1966. This application Feb. 10, 1969, Ser. No. 800,821
Int. Cl. F16f 1/36; C08g 17/10
U.S. Cl. 267—1          8 Claims

ABSTRACT OF THE DISCLOSURE

A shock absorbing unit comprising a shock absorbing element, the said element comprising a resilient cured polyureaurethane member, the said cured polyureaurethane characterized by deflecting from about 0.4 to about 0.5 inch upon the application of a pressure af about 1800 pounds per square inch uniformly to the surface areas of the end surfaces of the said polyureaurethane when the said polyureaurethane has the shape prescribed by the specification.

---

This application is a continuation of Ser. No. 562,681 filed July 5, 1966, now abandoned.

This invention relates to shock absorbing devices. More particularly, this invention relates to shock absorbing devices for use as or in draft gears for railroad cars.

Heretofore, various shock absorbing devices have been used to reduce the shock resulting from the coupling of railroad cars. These shock absorbing devices are generally known as draft gears. The steel spring is a useful shock absorbing device which has been used as such a draft gear. The steel spring is a useful shock absorbing device primarily because it has good shock absorbing characteristics at both low and very high load values. The ratio of the compression of the steel spring to a load applied to it is substantially constant over a wide range of applied load values. However, these steel springs are not practical for use as draft gears in railroad cars because a very large size steel spring is required. Thus, shock absorbing devices have been fabricated from other materials, such are rubber and other elastomers, and used for draft gears. One type of shock absorbing device which has been used as a draft gear for railroad cars has comprised a series of shock absorbing units. Each shock absorbing unit in the series comprised a resilient solid rubber or rubber-like element disposed between and attached to two opposing force-receiving supports or plates. The series of shock absorbing units were disposed transversally to the shock load by placing them in a cylinder. The side-walls of the rubber-like elements were generally concave. Thus, as a shock or a load was applied to the draft gear, the series of shock absorbing units offered a cushioning or shock absorbing resistance to the applied load and upon being compressed by the load, the rubber-like elements deformed laterally and were forced into the space provided by the concave sides of the rubber-like elements and the side of the cylinder. It is usually desired that such a draft gear has a compression versus load relationship substantially equivalent to that of a steel spring over a wide range of load values. However, the shock absorbing devices described have shock absorbing characteristics inferior to that of a steel spring over a wide range of load values. These shock absorbing devices typically have good shock absorbing characteristics at low loading values and poor shock absorbing characteristics at high loads. Usually their resistance to compression substantially increases at high load values. Thus, under the heavy loads to which a draft gear is subject, such a shock absorbing device has relatively little shock absorbing ability.

According to this invention, it was found unexpectedly that an improved draft gear of this type having good shock absorbing characteristics over a wide range of load values, is provided wherein the resilient members of the shock absorbing units are a resilient cured polyureaurethane.

It is usually desired that the shock absorbing unit of this invention having good shock absorbing characteristics over a wide range of load values comprises a shock absorbing element, the said element comprising a resilient, cured polyureaurethane member having two opposing and substantially parallel force-receiving surfaces connected by at least one sidewall.

In accordance with this invention, it has been found that certain cured resilient polyureaurethanes can be prepared having a sufficient shock absorbing ability to be useful in preparing the shock absorbing device of this invention. Such polyureaurethanes are prepared by reacting certain diamines with the reaction product of 3,3-bitoylene-4,4-diisocyanate and certain polymer polyesters wherein it is a critical feature of this invention that the mol ratio of the diisocyanate to the polymeric polyester is from about 1.8 to about 2.0 and preferably from about 1.85 to about 1.90, and then shaping and curing the reaction mixture.

The resilient cured polyureaurethane member of this invention can be prepared by reacting a diamine selected from the group consisting of orthodichlorobenzidine, methylene bis-ortho-chloroaniline, and their mixtures, with the reaction product of a mixture comprising 3,3-bitolylene-4,4-diisocyanate and a polymeric polyester of the structure obtained by the condensation of a mixture of a dicarboxylic acid or its anhydride and a hydrocarbon diol, the said polymeric polyester having a molecular weight of from about 1000 to about 2500, and preferably from about 1500 to about 2000, usually an acid number of less than about 10, preferably less than about 1, and more preferably less than about 0.5 wherein the mol ratio of the diisocyanate to the polyester is from about 1.8 to about 2.0, and preferably from about 1.85 to about 1.90, and then curing the reaction mixture.

In the practice of this invention it is usually preferred that from about 0.4 to about 0.85 mol of the diamine are added to the reaction product of the mixture comprising from about 1.8 to about 2.0 mols and preferably from about 1.85 to about 1.90 mols of the 3,3-bitolylene-4,4-diisocyanate and about 1 mol of the polymeric polyester.

The polymeric polyester can be prepared from dicarboxylic acids such as adipic acid and azelaic acid or their mixtures. Suitable hydrocarbon diols for the preparation of the polymeric polyester are diols containing from 2 to about 7 carbon atoms and their mixtures. Representative of such diols are ethylene glycol, propylene glycol, butane diol, butene diol, pentane diol, pentene diol, hexane diol, hexene diol, heptane diol and heptene diol.

The resilient cured polyureaurethane can be prepared by first reacting the polymeric polyester with the diisocyanate under substantially anhydrous conditions at a temperature of from about 100° C. to about 150° C. for about 30 to about 60 minutes. This reaction can be conducted at atmospheric or above or below atmospheric pressure. A catalyst can be added to the diisocyanate-polymeric polyester mixture to reduce its reaction time. When such a catalyst is used it is usually added to the polyester-diisocyanate reaction mixture before the addition of the diisocyanate or with the addition of the diisocyanate. Various catalysts can be used exemplatory of which are the amine catalysts such as triethyl amine, n-methyl-morphline, and n-ethyl morphline.

The diamine curative is then added to and mixed with the polymeric product of this reaction under essentially anhydrous conditions and preferably under a vacuum. The resulting polyureaurethane reaction mixture is then cast in a suitable mold and cured to form the resilient polyureaurethane member of this invention. The said reaction mixture can be cured at about 20° C. to about 50° C., although faster cures can be obtained at higher temperatures, for example, about 50° C. to about 200° C. Normally the reaction mixture is allowed to cure at 120° C. from 16 to about 24 hours.

When the resilient polyureaurethane member is prepared by pouring the polyureaurethane reaction mixture into a mold having the desired configuration and then curing the polyureaurethane reaction mixture, metal plates suitable for use as force-receiving plates for the shock absorbing device of this invention can be inserted in the mold before curing the polyureaurethane reaction mixture. If desired, a suitable bonding cement may be applied to the metal plates exemplatory of which are the cements taught to be useful in U.S. Patent 2,992,939 and Australian Patent 256,373. By curing the polyureaurethane reaction mixture in the presence of the said metal plates, a metal plate is adhered to at least one of the force-receiving surfaces of the polyureaurethane member to form a laminate of the structure shown in FIGS. 1 and 2, for instance.

For further understanding of the invention, reference may be had to the accompanying drawing in which.

Figure 1:
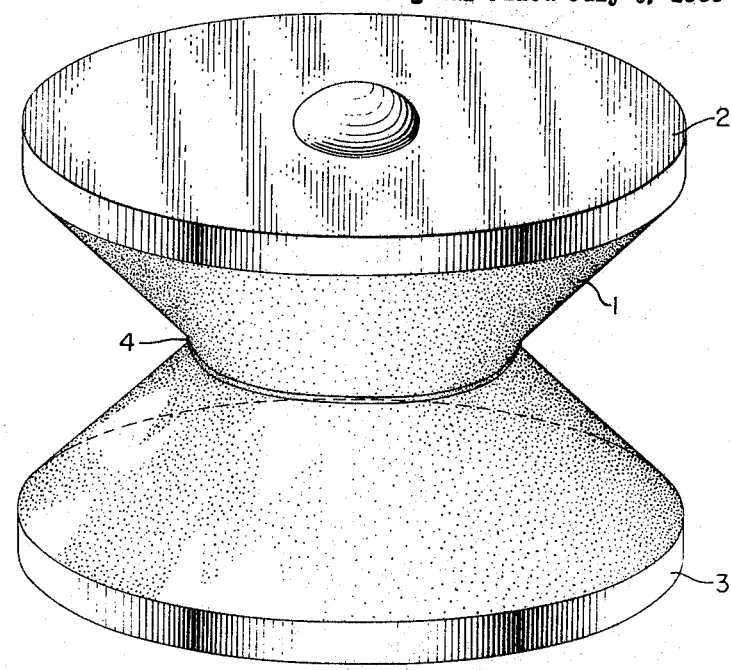
FIG. 1 is a perspective view illustrating one form of the shock absorbing device.
Figure 2:
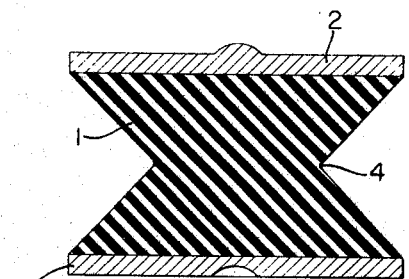
FIG. 2 is a vertical longitudinal sectional view further illustratnig the shock absorbing device.
Figure 3:
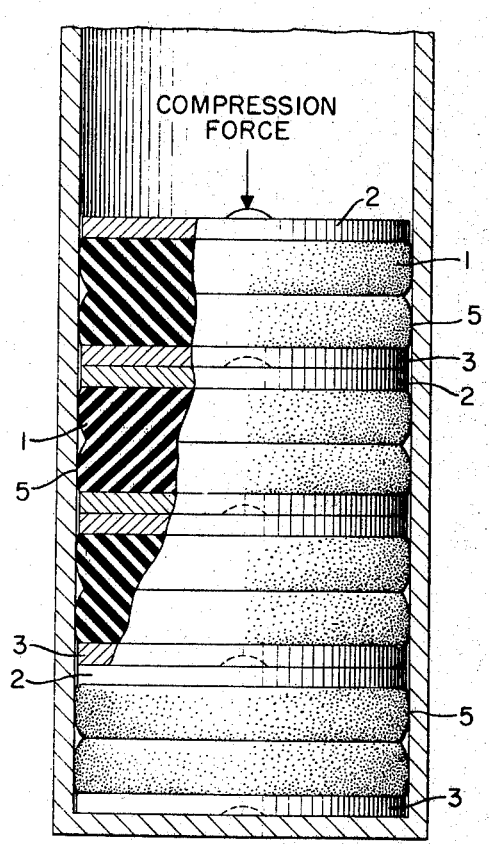
FIG. 3 is a vertical longitudinal sectional view of shock absorbing devices of the type shown in FIG. 1 and FIG. 2 placed in a supporting cylinder and disposed transversely to a compression force wherein the said shock absorbing devices are compressed to about 40 percent of their original height.

Referring to the drawings, the shock absorbing devices or units shown in FIG. 1 and FIG. 2 comprise the improved resilient cured polyureaurethane member (1) bonded or laminated to two opposite and substantially parallel force-receiving metal plates (2 and 3). A portion of the sidewall of the resilient polyureaurethane member is concave in the form of a V-shaped groove (4). The ratio of the volume displaced by the groove to the volumes of the polyureaurethane member plus that displaced by the groove times 100 is about equal to the percent compression anticipated. A suitable railroad draft gear can be formed as illustrated in FIG. 3 by combining several of the shock absorbing units of this invention to form a series of such units. As further shown by FIG. 3, under a suitable compression load the resilient cured polyureaurethane members deform and their sidewalls are forced laterally outward (5).

The following examples further illustrate the objects and advantages of this invention. The parts and percentages are by weight unless otherwise indicated.

EXAMPLE 1

To a reactor was charged under essentially anhydrous conditions 500 parts of a polyester prepared by the condensation of a mixture of ethylene glycol and propylene glycol in a mol ratio of 80 mols of ethylene glycol to 20 mols of propylene glycol with adipic acid, the said polyester having a molecular weight of about 2000 and an acid number of about 0.5. To the reactor was then added 131 parts of 3,3-bitolylene-4,4-diisocyanate and 0.3 part of triethylamine. The mixture was continuously stirred and allowed to react at about 130° C. for about 30 minutes. To this mixture was added 45 parts of ortho-dichlorobenzidine. The resulting polyureaurethane reaction mixture was immediately poured into a mold cavity and cured at 125° C. for about 16 hours. The cured polyureaurethane was removed from the mold to yield a resilient material of a substantially cylindrical form having a diameter of 6½ inches and a height of 1½ inches, wherein the top and the bottom of the cylinder comprised two opposing and substantially parallel surfaces and wherein a concave sidewall connected the said top and bottom of the cylinder as shown in the accompanying drawing.

EXAMPLE 2

A polyureaurethane reaction mixture was prepared according to Example 1 and immediately poured into the mold used in Example 1 in which had been inserted two steel plates having diameters of 6½ inches and thicknesses of ⅛ inch. The steel plates had been heat treated to minimize their distortion when subjected to a compressive force. The said reaction mixture was then cured at 125° C. for about 16 hours to provide a polyureaurethane bonded to the steel plates in the form of a polyureaurethane-steel laminate as shown in the accompanying drawing. This laminate structure, when used as a shock absorber in a railroad car draft gear, provided good shock absorbing characteristics for a wide rang of compression load values.

The shock absorbers of this invention were tested by applying 60,000 pounds pressure uniformly to the end surfaces of a shock absorbing unit having a resilient cured polyureaurethane member, the said cured polyureaurethane having a generally cylindrical shape with a circular cross-section and circular parallel end surfaces having diameters of 6.5 inches, a height of 1.5 inches, and a sidewall connecting the said end surfaces in the form of a V-shaped groove having equal length sides extending between the said end surfaces in the manner shown by FIG. 1, the volume of the said cured polyureaurethane being about 150 percent being of the volume of the said groove. Normally such a V-groove in such polyureaurethane member of these dimensions has an apex with an angle of about 50 degrees. Polyureaurethane members prepared according to this invention and having these dimensions deflect from about 0.40 to about 0.50 and preferably from about 0.45 to about 0.50 inch upon application of the 60,000 pound force. Thus, the cured polyureaurethane of this invention is characterized by deflecting from about 0.4 to about 0.5 inch and preferably from about 0.45 to about 0.5 inch upon the application of about 1800 pounds per square inch uniformly to the surface areas of the said polyureaurethane when the said polyureaurethane has a generally cylindrical shape with circular parallel end surfaces having diameters of 6.5 inches, a height of 1.5 inches, and a sidewall connecting the end surfaces in the shape of a V-shaped groove having equal length sides, the said groove extending between the said end surfaces, the volume of the said groove being about two-thirds of the volume of the said polyureaurethane. A substantially rigid plate can be adhered to at least one of the said end surfaces of the polyureaurethane member to assist in uniformly distributing the force over the surface of the said end surface. Shock absorbers having polyureaurethane members prepared according to this invention but having too low a mol ratio of diisocyanate to polymeric polyester deflect more than about 0.50 inch when subjected to this test. Such shock absorbers when used in a railroad car draft gear absorb insufficient amount of energy and thus, are usually fully compressed before sufficient compressive force energy is absorbed and break down during useage. Such shock absorbers having a polyureaurethane member having too high a ratio of diisocyanate to polymeric polyester deflect less than about 0.40 inch when subjected to this test. When used in a railroad draft gear, they absorb an insufficient amount of energy before transmitting the energy, or force resulting from coupling the railroad car, through the draft gear and also break down during useage.

While certain representative embodiments and details have been shown for the purpose of illustrating the invention, it will be apparent to those skilled in this art

What is claimed is:

1. A solid shock absorbing unit suitable for use in a railroad draft gear comprising a shock absorbing element, the said element comprising a resilient polyureaurethane member, wherein the polyureaurethane member deflects from about 0.4 to about 0.5 inch upon the application of a pressure of 1800 pounds per square inch uniformly to the surface areas of the end surfaces of the said polyureaurethane member wherein the said member has a generally cylindrical shape with substantially circular parallel end surfaces having diameters of 6.5 inches, a height of 1.5 inches, and a sidewall connecting the said end surfaces in the form of a V-shaped groove having equal length sides, the said groove extending between the said end surfaces, the volume of the said groove being about two-thirds of the volume of the said cured polyureaurethane member, wherein the polyureaurethane member is prepared by reacting from about 0.4 to about 0.85 mol of a diamine selected from the group consisting of orthodichlorobenzidine, methylene bis-orthochloroaniline and their mixtures, with the reaction product of a mixture comprising 3,3-bitolylene-4,4-diisocyanate and a polymeric polyester of the structure obtained by the condensation of a mixture of a dicarboxylic acid selected from adipic acid and azelaic acid and a hydrocarbon diol selected from ethylene glycol and propylene glycol, said polymeric polyester having a molecular weight of from about 1000 to about 2500, and we ehnitrhe-crY-4ETAOINETAO— to about 2500, and wherein the mol ratio of the diisocyanate to the polyester is from about 1.8 to about 2.0.

2. A shock absorbing unit according to claim 1 wherein a substantially rigid plate is adhered to at least one of the said end surfaces.

3. A shock absorbing unit comprising a shock absorbing element, the said element comprising a resilient polyureaurethane member, the said polyureaurethane characterized by deflecting from about 0.4 to about 0.5 inch upon the application of a pressure of about 1800 pounds per square inch uniformly to the surface areas of the end surfaces of the said polyureaurethane when the said polyureaurethane has a generally cylindrical shape with circular parallel end surfaces having diameters of 6.5 inches, a height of 1.5 inches, and a sidewall connecting the said end surfaces in the form of a V-shaped groove having equal length sides, the said groove extending between the said end surfaces, the volume of the said groove being about two-thirds of the volume of the said polyureaurethane member, wherein the polyureaurethane member is prepared by reacting from about 0.4 to about 0.85 mol of a diamine selected from the group consisting of orthodichlorobenzidine, methylene bis-orthochloroaniline and their mixtures, with the reaction product of a mixture comprising 3,3-bitolylene-4,4-diisocyanate and a polymeric polyester of the structure obtained by the condensation of a mixture of a dicarboxylic acid and a hydrocarbon diol, said polymeric polyester having a molecular weight of from about 1000 to about 2500, and wherein the mol ratio of the diisocyanate to the polyester is from about 1.8 to about 2.0.

4. A solid shock absorbing unit according to claim 3 wherein the said polyureaurethane member has two opposing and substantially parallel force-receiving surfaces and are connected by at least one concave sidewall.

5. A shock absorbing unit according to claim 4 wherein a metal plate is adhered to at least one of the said force-receiving surfaces.

6. The shock absorbing unit according to claim 3 where the polymeric polyester used for preparing the polyureaurethane member is of the srtucture obtained by the condensation of a mixture of a dicarboxylic acid selected from adipic acid and azelaic acid and a hydrocarbon diol selected from ethylene glycol and propylene glycol.

7. The shock absorbing unit according ot claim 3 wherein the polyureaurethane member is prepared by reacting orthodichlorobenzidine with the reaction product of a mixture of 3,3-bitolylene-4,4-diisocyanate and a polymeric polyester obtained by the condensation of a mixture of ethylene glycol and propylene glycol in a mol ratio of about 80 mols of ethylene glycol to about 20 mols of propylene glycol with adipic acid.

8. The solid shock absorbing unit according to claim 5 wherein the polyureaurethane member is prepared by reacting orthodichlorobenzidine with the reaction product of a mixture of 3,3-bitolylene-4,4-diisocyanate and a polymeric polyester obtained by the condensation of a mixture of ethylene glycol and propylene glycol in a mol ration of about 80 mols of ethylene glycol to about 20 mols of propylene glycol with adipic acid.

References Cited

UNITED STATES PATENTS

| | | |
|---|---|---|
| 2,656,936 | 10/1953 | Danielson et al. |
| 2,880,885 | 4/1959 | Willison. |
| 3,301,335 | 1/1967 | Snelling. |
| 3,315,951 | 4/1967 | Boschi et al. |

DUANE A. REGER, Primary Examiner

U.S. Cl. X.R.

260—75; 267—63

PO-1050
(5/69)

UNITED STATES PATENT OFFICE
CERTIFICATE OF CORRECTION

Patent No. 3,504,901        Dated April 7, 1970

Inventor(s) James E. Ditty

It is certified that error appears in the above-identified patent and that said Letters Patent are hereby corrected as shown below:

Column 1, line 43, "are" should read -- as --.

Column 3, line 32, "illustratnig" should read --illustrating--.

Column 4, line 22, "rang" should read -- range --.

Column 5, line 31, garbled type and should be deleted

Column 6, line 38, "ration" should read -- ratio --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents